United States Patent
Muramatsu et al.

(10) Patent No.: US 9,030,291 B2
(45) Date of Patent: May 12, 2015

(54) APPARATUS FOR CONTROLLING VEHICLE OPENING/CLOSING ELEMENT

(71) Applicant: Panasonic Corporation, Osaka (JP)

(72) Inventors: Hirokazu Muramatsu, Kanagawa (JP); Kenji Oka, Kanagawa (JP); Seiji Yoshida, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 129 days.

(21) Appl. No.: 13/830,000

(22) Filed: Mar. 14, 2013

(65) Prior Publication Data

US 2013/0200995 A1    Aug. 8, 2013

Related U.S. Application Data

(63) Continuation of application No. PCT/JP2012/004782, filed on Jul. 26, 2012.

(30) Foreign Application Priority Data

Jul. 29, 2011    (JP) ................... 2011-167235

(51) Int. Cl.
*B60R 25/00*    (2013.01)
*G06K 9/00*    (2006.01)
(Continued)

(52) U.S. Cl.
CPC ........ *G06K 9/00355* (2013.01); *B60R 25/2045* (2013.01); *G06F 3/017* (2013.01);
(Continued)

(58) Field of Classification Search
CPC .......................... G06F 3/017; B60R 25/2045
USPC ........ 340/3.1, 5.1, 5.2, 5.51, 5.52, 5.53, 5.54, 340/5.8, 5.81, 8.82, 5.83, 426.28, 428.36; 382/115, 116, 119
See application file for complete search history.

(56) References Cited

U.S. PATENT DOCUMENTS 5,682,135 A * 10/1997 Labonde .................. 340/426.17
5,812,067 A      9/1998 Bergholz et al.
(Continued)

FOREIGN PATENT DOCUMENTS

CN        1932845 A      3/2007
JP    2003-138817 A      5/2003
(Continued)

OTHER PUBLICATIONS

International Search Report issued in International Patent Application No. PCT/JP2012/004782 dated Sep. 18, 2012.
(Continued)

*Primary Examiner* — Andrew Bee
(74) *Attorney, Agent, or Firm* — McDermott Will & Emery LLP

(57) ABSTRACT

A system for controlling vehicle opening/closing element has a radiation block for irradiating near-infrared light to a peripheral region of an opening/closing element; a photographing block that photographs an image irradiated with the near-infrared light; a hand region extraction block that extracts a user's hand region from brightness of an image photographed by the photographing block; a motion detection block that detects motions of the user's hand from the extracted hand region; and a control block that determines whether or not the detected motions coincide with previously-set predetermined motions and that commands operation of the opening/closing element in accordance with the determined motions.

13 Claims, 11 Drawing Sheets

(51) Int. Cl.
  *B60R 25/20* (2013.01)
  *G06F 3/01* (2006.01)
  *B60R 25/24* (2013.01)
  *G07C 9/00* (2006.01)
  *E05F 15/20* (2006.01)

(52) U.S. Cl.
  CPC ............ *B60R 25/24* (2013.01); *E05Y 2201/68* (2013.01); *E05Y 2400/86* (2013.01); *E05Y 2900/531* (2013.01); *G07C 9/00309* (2013.01); *G07C 9/00563* (2013.01); *G07C 2209/65* (2013.01); *E05Y 2400/852* (2013.01); *E05F 2015/2069* (2013.01); *E05Y 2600/46* (2013.01); *E05Y 2800/106* (2013.01); *E05Y 2800/426* (2013.01); *E05F 15/2023* (2013.01); *E05Y 2800/73* (2013.01)

(56) References Cited

U.S. PATENT DOCUMENTS

| | | | | |
|---|---|---|---|---|
| 2002/0152010 | A1* | 10/2002 | Colmenarez et al. | 701/36 |
| 2004/0022421 | A1* | 2/2004 | Endoh et al. | 382/115 |
| 2006/0145825 | A1* | 7/2006 | Mc Call | 340/426.35 |
| 2006/0244312 | A1 | 11/2006 | Ogino et al. | |
| 2007/0058841 | A1 | 3/2007 | Miura et al. | |
| 2007/0135984 | A1 | 6/2007 | Breed et al. | |
| 2010/0226539 | A1* | 9/2010 | Ishii | 382/104 |
| 2011/0080252 | A1* | 4/2011 | Ibsies | 340/3.1 |
| 2011/0080490 | A1* | 4/2011 | Clarkson et al. | 348/222.1 |
| 2012/0217764 | A1 | 8/2012 | Ishiguro et al. | |
| 2013/0234970 | A1* | 9/2013 | Hodges et al. | 345/173 |
| 2014/0136024 | A1* | 5/2014 | Herthan | 701/2 |

FOREIGN PATENT DOCUMENTS

| | | |
|---|---|---|
| JP | 2003-301639 A | 10/2003 |
| JP | 2006-328932 A | 12/2006 |
| JP | 2009-134422 A | 6/2009 |
| JP | 2010-058665 A | 3/2010 |
| WO | 2011-058856 A1 | 5/2011 |

OTHER PUBLICATIONS

Extended European Search Report for 12820006.0 dated Nov. 27, 2014.

Chinese Office Action issued in Chinese Application No. 201280003522.6, dated Jan. 13, 2015, with English translation.

* cited by examiner

CENTROID POSITION

CENTROID POSITIONS OF HAND REGION AND
SHIFTS OF THEM IN SEQUENCE OF TIME
"n," TIME "n+1," AND TIME "n+2"

TRAJECTORY OF HAND FROM
TIME "n" TO TIME "n+2"

APPARATUS FOR CONTROLLING VEHICLE OPENING/CLOSING ELEMENT

RELATED APPLICATIONS

This application is a continuation of PCT International Application PCT/JP2012/004782 filed on Jul. 26, 2012, which claims priority to Japanese Patent Application No. 2011-167235 filed on Jul. 29, 2011. The disclosures of these applications including the specifications, the drawings, and the claims are hereby incorporated by reference in their entirety.

BACKGROUND OF THE INVENTION

The invention relates to an apparatus for controlling vehicle opening/closing element that makes it possible to control an opening/closing element of a vehicle according to a user's wish without a user's touch with the element.

A recent vehicle opening/closing element; in particular, a door open/close control system, has commonly adopted a method under which a user establishes wireless communication between a vehicle and a portable electronic key by use of a portable electronic key. As to timing when wireless communication develops between the vehicle and the portable electronic key, wireless communication is triggered by user's action for pressing a lock/unlock button of the portable electronic key under one method. Under another method, wireless communication is automatically initiated when the portable electronic key enters a predetermined communication range from a vehicle. In any case, a vehicle door is shifted to an unlock standby state by wireless communication and can be easily unlocked by a user's touch with a door handle. The phrase "unlock standby state" designates a state in which the opening/closing element is not yet unlocked at this point in time and capable of unlocking the opening/closing element (or simultaneously opening a door) by a user's additional action.

However, in order for the user to come on board the vehicle, opening the vehicle door is necessary. However, in order to open the vehicle door, the user must perform motion of laying his/her hand on a handle of the door and pulling open the door. For instance, consider that the user carries pieces of baggage or suffers an injury on his/her arm, the user will encounter difficulty in performing opening motion itself, which can be said to mar user's convenience.

In order to address such a problem, a vehicle door control system described in connection with Patent Literature 1 is provided with outside photographing means for photographing a user who is present at a position outside the vehicle where he/she can visually recognize the vehicle door, and an orientation and a motion trajectory of a user's hand or finger are specified by means of an image. Thus, the vehicle door control system can direct the vehicle door to unlock and open by means of motions of the finger or hand without user's direct manipulation of the handle of the vehicle door.

CITATION LIST

Patent Literature

Patent Literature 1: JP-A-2010-58665

The vehicle door control system is on the basis of the premise that the system can identify the user's hand or finger by an image about the outside of the vehicle. In a real environment in which the vehicle finds itself, mere provision of means capable of capturing an image about the outside of the vehicle, such as that descried in connection with Patent Literature 1, is insufficient to enable accurate authentication. For instance, when the vehicle finds itself in an environment of low luminance intensity, as in the open air during the night, an image will become considerably blurred because of a lack of sensitivity of the photographing device. Even during the daytime in which sufficient luminance intensity is available, the user will appear solid black in an image if the user stands against the backdrop of the sun. As above, in the existing system, the method for identifying the user's hand or finger in the image captured in the real environment with superior accuracy has problems in itself. This has posed difficulty in stably assuring user's convenience.

SUMMARY

The invention is intended to provide an apparatus for controlling vehicle opening/closing element that can identify a user's motion accurately without depending on an environment and that can control an opening/closing element without a user's touch on the opening/closing element according to the user's wish to open or close the vehicle opening/closing element.

An apparatus for controlling vehicle opening/closing element of the invention has a near-infrared light radiation block (e.g., near-infrared LEDs 210 to 213 of an embodiment) for irradiating near-infrared light to a peripheral region of an vehicle opening/closing element; a photographing block (e.g., photographing blocks 220 to 223 of the embodiment) that photographs an image including a region irradiated with the near-infrared light; a hand region extraction block (e.g., a hand region extraction block 203 of the embodiment) that extracts a user's hand region from brightness of an image photographed by the photographing block; a motion detection block (e.g., a motion detection block 204 of the embodiment) that detects motions of the user's hand from the hand region extracted by the hand region extraction block; and an opening/closing element operation command control block (e.g., an operation command control block 205 of the embodiment) that commands operation of the opening/closing element if a match exists between the motions detected by the motion detection block and previously-set predetermined motions.

By means of the configuration, user's motions can be determined with superior accuracy. Accordingly, there can be provided an apparatus for controlling vehicle opening/closing element capable of controlling an opening/closing element without a user's touch with the element according to a user's wish to open or close the element.

In the apparatus for controlling vehicle opening/closing element of the invention, the near-infrared light radiation block and the photographing block are characterized by being placed in a peripheral region of the operation block of the opening/closing element to which a hand, among body parts of the user, can come closest.

The configuration yields an advantage of the ability to detect the user's hand with superior accuracy and prevent the user from feeling a burden when performing action, such as stretching the hand to the opening/closing element. Moreover, since the user stands in front of the photographing block, the photographing block is hidden behind the user, thereby preventing direct penetration of sunlight to the photographing block. Accordingly, photographing can stably be performed in an environment of backlight.

In the apparatus for controlling vehicle opening/closing element of the invention, the near-infrared light radiation block and the photographing block are characterized by being placed beneath a door handle of the vehicle.

By means of the configuration, the door handle of the vehicle obstructs raindrops. Hence, adhesion of raindrops to the surface (a lens) of the photographing block can thereby be prevented, so that stable photographing can be performed even in an environment of the rain.

In the apparatus for controlling vehicle opening/closing element of the invention, the near-infrared light radiation block and the photographing block are characterized by being placed pointing in parallel to or downwardly with reference to a road surface.

By means of the configuration, a horizontal optical axis of the photographing block is oriented downwardly with reference to a horizontal line. This can prevent direct penetration of sunlight to the photographing block. Accordingly, photographing can stably be performed in an environment of backlight.

In the apparatus for controlling vehicle opening/closing element of the invention, the near-infrared light radiation block radiates a quantity of near-infrared light that saturates a brightness value of pixels of a region, in an image photographed by the photographing block, which represents a subject located within a predetermined distance from the opening/closing element.

By means of the configuration, only the arm stretched by the user to the opening/closing element is irradiated with near-infrared light. This makes it possible to distinguish only the user's hand from the others in the photographed image.

In the apparatus for controlling vehicle opening/closing element of the invention, the hand region extraction block extracts, as a user's hand region, a region of the pixels whose brightness values are saturated in the image photographed by the photographing block.

By means of the configuration, when the user intentionally stretches his/her hand to the opening/closing element, the user's hand region can readily be extracted from the image.

In the apparatus for controlling vehicle opening/closing element of the invention, the motion determination block is characterized by taking, as a target, a trajectory or geometry of a hand as hand motions to be detected.

By means of the configuration, the user's hand can be taken as a target for determination only when the user intentionally moves his/her hand. Therefore, the system can be prevented from erroneously operating when the user does not intend.

In the apparatus for controlling vehicle opening/closing element of the invention, the opening/closing element operation command control block is characterized by controlling locking, unlocking, opening, and closing of the opening/closing element according to the user's hand motions detected by the motion detection block.

The configuration makes it possible to control locking, unlocking, opening, and closing operations without the user's direct touch on the operation block of the opening/closing element, which enhances user's convenience.

In the apparatus for controlling vehicle opening/closing element of the invention, the near-infrared light radiation block and the photographing block are respectively mounted in response to each of the vehicle opening/closing elements.

The configuration makes it possible to photograph an image of user's hand stretched to each of the opening/closing elements. Motions of the user's hand can be acquired with superior accuracy. Moreover, which one of the opening/closing elements the user desires to operate can be made obvious.

In the apparatus for controlling vehicle opening/closing element of the invention, the opening/closing element operation command control block is characterized by controlling the opening/closing element corresponding to the photographing block that photographs an image when the motion detection block detects the hand motions.

The configuration makes it possible to command, according to a user's wish, the opening/closing element to be operated because the opening/closing element to which the user stretched his/her arm can be subjected to open/close control.

The apparatus for controlling vehicle opening/closing element of the invention is equipped with a user authentication block (e.g., a vein feature extraction block 207 and a vein feature matching block 208 of the embodiment) that determines whether or not the user who is about to operate the opening/closing element is an authorized user of the vehicle. The opening/closing element operation command control block is characterized by commanding operation of the opening/closing element when the user authentication block determines that the user is an authorized user.

By means of the configuration, the third parties other than the authorized user previously registered in the vehicle cannot use the system, so that security can be enhanced.

In the apparatus for controlling vehicle opening/closing element of the invention, the user authentication block is characterized by determining whether or not the user is an authorized user by means of authenticating a vein of a hand region utilizing near-infrared light.

By means of the configuration, the vein authentication considered to exhibit high reliability, among biometrics, is used to authenticate the user. Hence, security is enhanced. Further, the system can be implemented as devices without addition of the near-infrared radiation block and the photographing block that are required for vein authentication, which can curtail cost.

In the apparatus for controlling vehicle opening/closing element of the invention, the near-infrared light radiation block is characterized by radiating a quantity of near-infrared light that enables extraction of a vein feature from an image of the user's hand region photographed by the photographing block when the user authentication block performs vein authentication.

By means of the configuration, the near-infrared radiation block is adjusted to an optimum quantity of light according to whether the user's hand region is extracted or a vein feature is extracted from the extracted hand region. Therefore, an optimum image can be photographed according to an application.

DETAILED DESCRIPTION OF EMBODIMENTS

A system for controlling vehicle opening/closing element of an embodiment of the invention is hereunder described by reference to the drawings.

Figure 1:
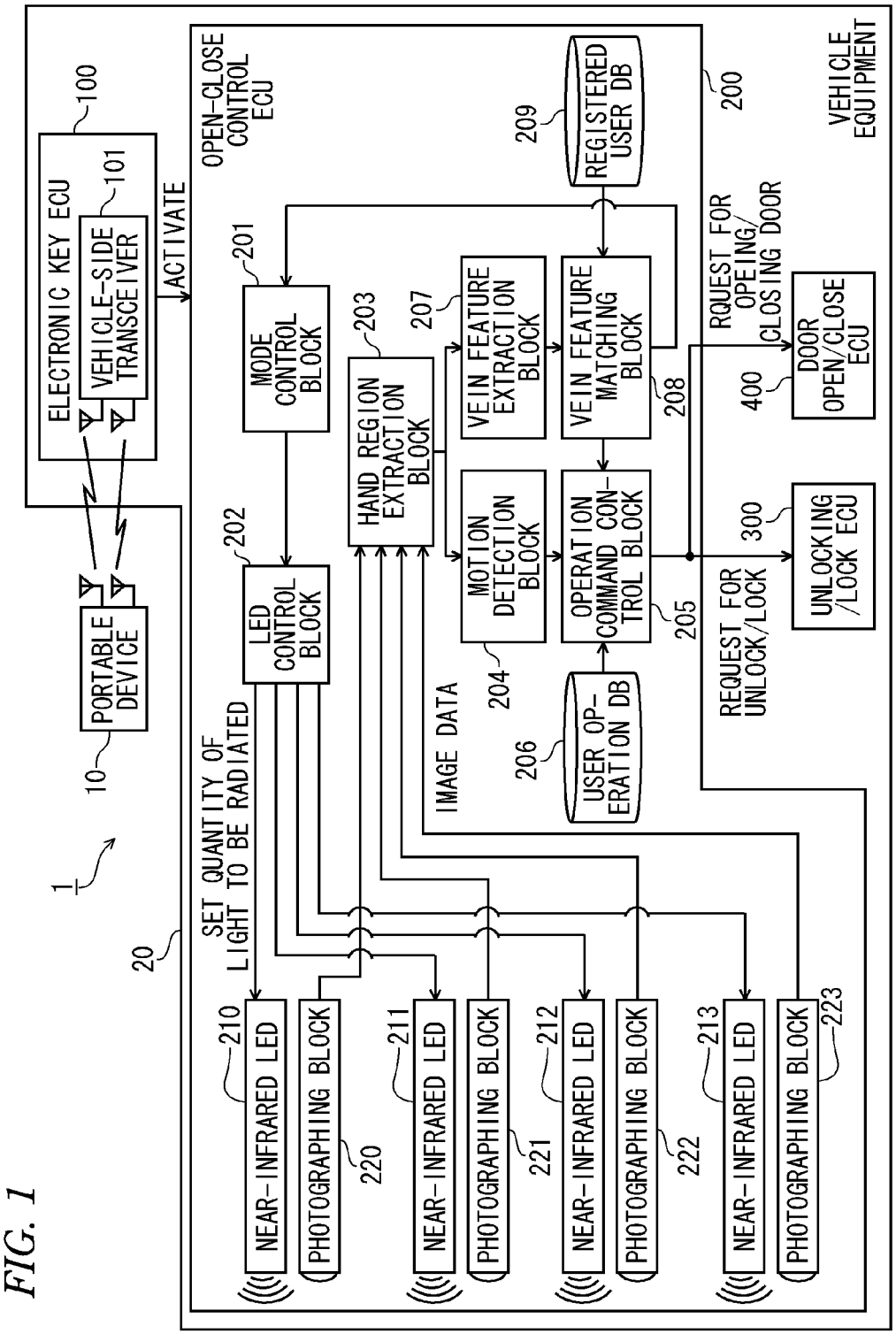
FIG. 1 is a block diagram showing a configuration of a system for controlling vehicle opening/closing element of an embodiment of the invention.

FIG. 1 is a block diagram showing a configuration of the system for controlling vehicle opening/closing element of the embodiment of the invention. An illustrated system for controlling vehicle opening/closing element 1 is made up of a portable device 10 a user can carry and vehicle equipment 20 mounted on a vehicle. The portable device 10 corresponds to a so-called portable electronic key.

The vehicle equipment 20 has an electronic key ECU 100 that establishes wireless communication with the portable device 10, thereby controlling activation of an open-close control ECU (Electronic Control Unit) 200; the open-close control ECU 200 that controls a vehicle opening/closing element (not shown); an unlocking/locking ECU 300 that performs unlocking and locking of the vehicle opening/closing element under control of the open-close control ECU 200; and a door open/close ECU 400 that opens and closes the vehicle opening/closing element under control of the open-close control ECU 200.

The vehicle opening/closing element includes passenger doors (including slide doors), a trunk door, opening/closing windows, and others. The system can be applied to any of the opening/closing elements. Explanations are now given below by taking, as an example, the passenger doors. However, the invention is not limited to the vehicle opening/closing elements but can be applied also to opening/closing elements, such as a door that opens into a building, like a house, and a room.

The portable device 10 and the electronic key ECU 100 can employ a known smart key entry system. The portable device 10 establishes a wireless communication with a vehicle-side transceiver 101 provided in the electronic key ECU 100. When determined that the user with the portable device 10 had approached the vehicle, the electronic key ECU 100 activates the open-close control ECU 200. The vehicle opening/closing elements enter unlock-standby state upon activation of the open-close ECU 200

The smart key entry system is not indispensable for activating the open-close control ECU 200, and other entry systems can also be utilized. For instance, when the user pressed the unlock/lock button of the portable device 10, the electronic key ECU 100 can also activate the open-close control ECU 200. Even in this case, the vehicle opening/closing element enters unlock-standby state in response to activation of the open-close control ECU 200, so the same control is effected in unlock-standby state.

When the open-close control ECU 200 starts up, the vehicle opening/closing element starts controlling the opening/closing element in the unlock-standby state.

The open-close control ECU 200 includes a mode control block 201; near-infrared LEDs 210 to 213; photographing blocks 220 to 223; an LED control block 202; a hand region extraction block 203; a motion detection block 204; a user operation database (a user operation DB) 206; an operation command control block 205; a vein feature extraction block 207; a registered user database (a registered user DB) 209; and a vein feature matching block 208.

The mode control block 201 designates either a "user operation mode" or a "user authentication mode" as an open-close control mode for the LED control block 202. In accordance with the mode designated by the mode control block 201, the LED control block 202 controls quantities of radiation from the respective near-infrared LEDs 210 to 213. The near-infrared LEDs 210 to 213 shed near-infrared rays on peripheral regions of the respective opening/closing elements. The photographing blocks 220 to 223 photograph the peripheral regions of the opening/closing elements including regions irradiated by the near-infrared LEDs 210 to 213.

The hand region extraction block 203 extracts a user's hand region from the photographs captured by the photographing blocks 220 to 223. The motion detection block 204 is for detecting motions of the user's hand from information about the hand region extracted by the hand region extraction block 203 when the mode control block 201 is set in the user operation mode. The user operation database 206 stores as database information about hand motions defined for operating the opening/closing element. Operation of the opening/closing element is one for locking/unlocking or opening/closing the opening/closing element.

The operation command control block 205 determines whether or not the motion detected by the motion detection block 204 matches the information stored in the user operation database 206. If the motion matches the user operation database 206, the operation command control block 205 performs control so as to command the opening/closing element to perform user's operation directed thereto according to a definition of the motion. The user operation database 206 can be updated. User operation for actuating the opening/closing element can be changed by updating the user operation database 206.

When the mode control block 201 is set in the user authentication mode, the vein feature extraction block 207 extracts a vein feature from the information about the hand region extracted by the hand region extraction block 203 in order to authenticate the user's vein. The registered user database 209 stores as database a vein feature of an authorized user previously registered in the vehicle. The vein feature matching block 208 matches the vein feature extracted by the vein feature extraction block 207 with the information stored in the registered user database 209.

Figure 2:
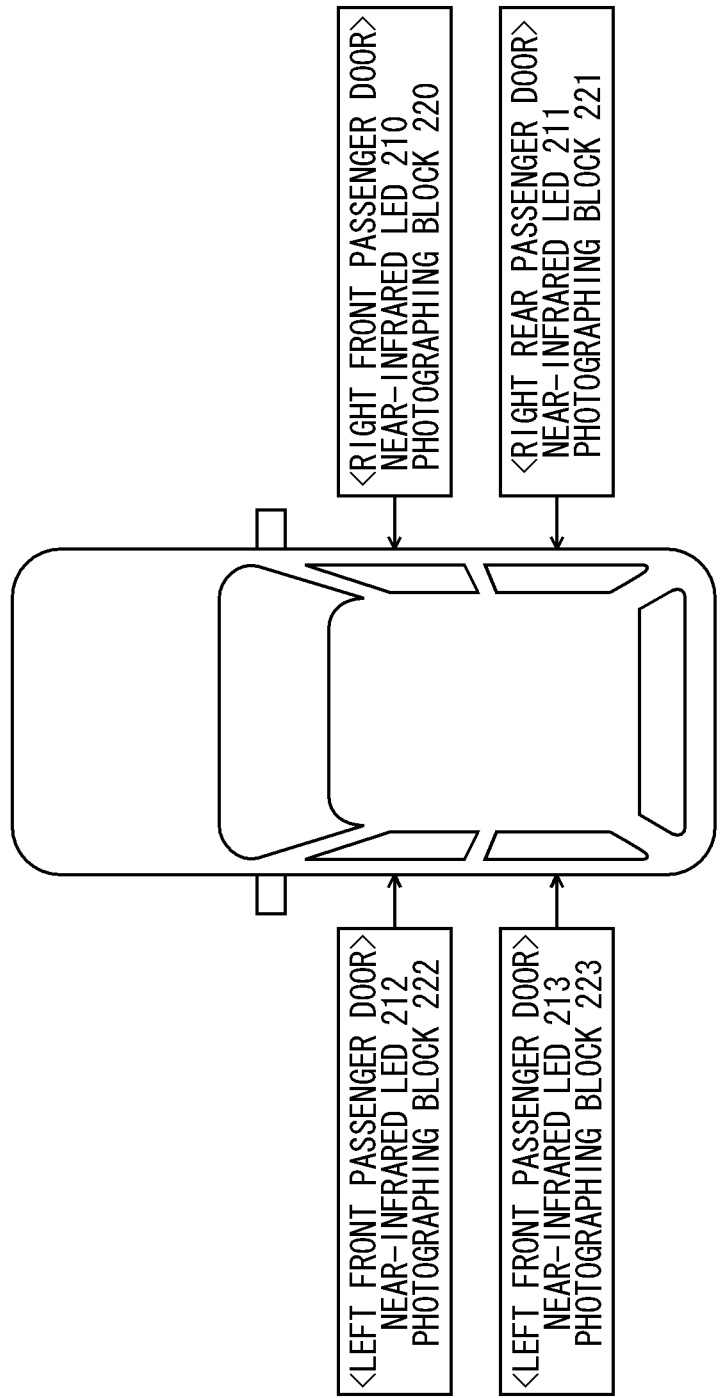
FIG. 2 is a diagram showing exemplary mount positions of near-infrared LEDs and photographing blocks corresponding to individual opening/closing elements.

The near-infrared LED and the photographing block are mounted as a set on the opening/closing element to be operated. For instance, assume that the vehicle is a four-door car, the near-infrared LED 210 and the photographing block 220 are mounted on a right front passenger door of the vehicle; the near-infrared LED 211 and the photographing block 221 are mounted on a right rear passenger door; the near-infrared LED 212 and the photographing block 222 are mounted on a left front passenger door; and the near-infrared LED 213 and the photographing block 223 are mounted on a left rear passenger door as shown in FIG. 2. The LED control block 202 controls each of the near-infrared LEDs 210 to 213. Data on images captured by each of the photographing blocks 220 to 223 are input to the hand region extraction block 203. In the following descriptions, an explanation is given to a typical set of the near-infrared LED and the photographing block while the near-infrared LED 210 and the photographing block 220 are taken as examples.

Operation of the open-close control ECU 200 is now described in detail by reference to the drawings.

Figure 3:
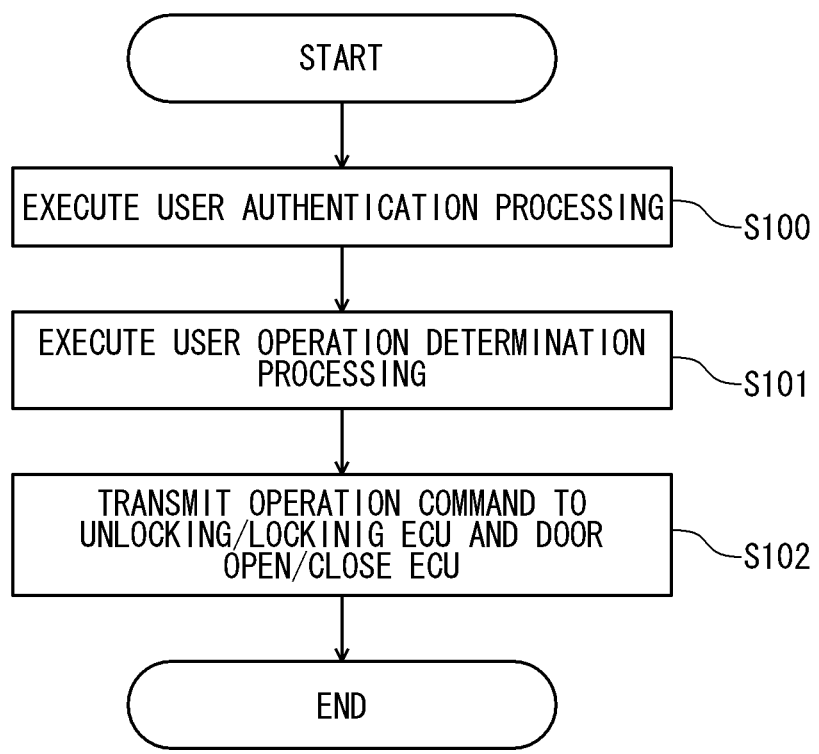
FIG. 3 is a flowchart that explains an operation mode for controlling the opening/closing elements immediately after startup of an open-close control ECU 200.

FIG. 3 is a flowchart that explains an operation mode for controlling the opening/closing element immediately after startup of the open-close control ECU 200. Upon being activated, the open-close control ECU 200 first performs user authentication (step S100). During the course of performance of processing pertaining to step S100, the open-close control ECU 200 is in the "user authentication mode." In step S100, the open-close control ECU 200 determines whether or not the photographed user is a previously registered user (i.e., an authorized user). When the photographed user is not the authorized user, the open-close control ECU 200 terminates processing without accepting operation directed toward the opening/closing element. When the photographed user is the authorized user, the open-close control ECU 200 subsequently determines user operation (step S101). Next, on the basis of a result of the determination about user operation rendered in step S101, the open-close control ECU 200 sends a control command to the unlocking/locking ECU 300 and the door open/close ECU 400 (step S102). During the course of performance of processing pertaining to steps S101 and S102, the open-close control ECU 200 is in the "user operation mode." Processing pertaining to steps S101 and S102 can also be performed repeatedly. User authentication processing (step S100) does not always need to be performed in system operation. However, system security can be enhanced by performing user authentication processing.

Details of user operation determination processing (step S101) are now described.

Figure 4A:
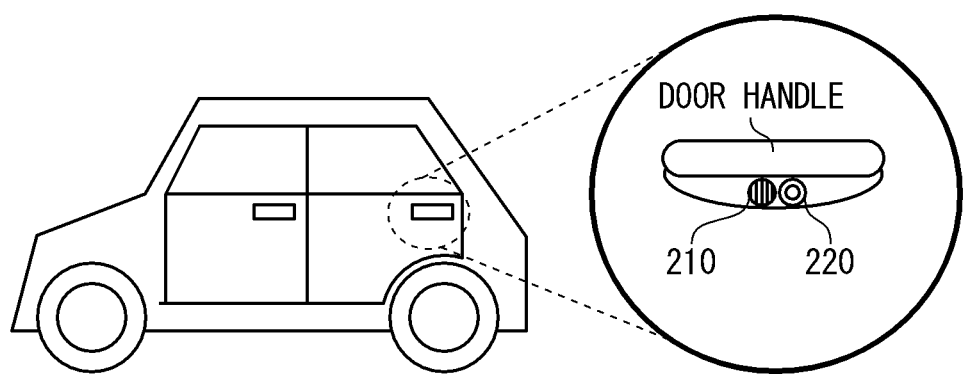
FIG. 4A is a diagram showing an example in which a near-infrared LED and a photographing block are mounted beneath a door handle.
Figure 4B:
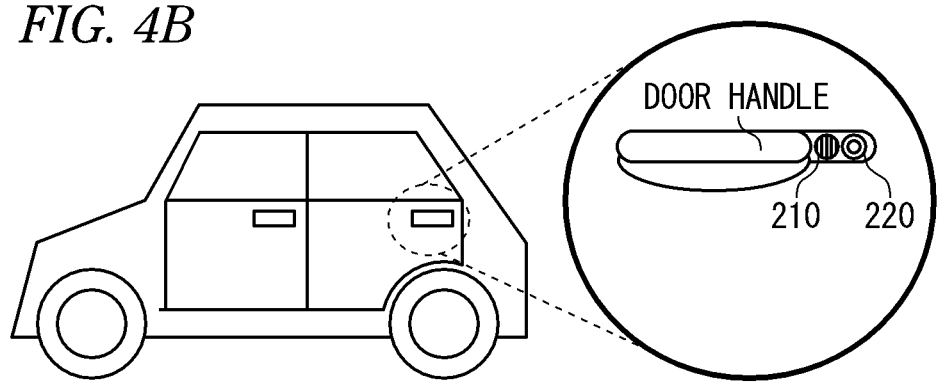
FIG. 4B is a diagram showing an example in which the near-infrared LED and the photographing block are mounted beside the door handle.

The open-close control ECU 200 performs control operation such that the photographing block 220 photographs the user who is present around the opening/closing element during the course of irradiation being performed by the near-infrared LED 210. Explanations are given to locations where the near-infrared LED 210 and the photographing block 220 are to be mounted. In the embodiment, in order to utilize motions of the use's hand to control the opening/closing element, the near-infrared LED 210 and the photographing block 220 are mounted around an operation block of the opening/closing element so that the photographing block 220 can photograph the user's hand without imposing a burden or unpleasant sensation on the user. FIGS. 4A and 4B show example mount positions set on the premise that the user actuates the passenger door from the outside of the vehicle. FIG. 4A shows an example in which the near-infrared LED 210 and the photographing block 220 are mounted beneath the door handle, and FIG. 4B shows an example in which the near-infrared LED 210 and the photographing block 220 are disposed beside the door handle.

The essential requirement for the system is that the near-infrared LED 210 and the photographing block 220 be mounted around the door handle. However, if they are mounted beneath the door handle as shown in FIG. 4A, there can be expected an effect of the photographing block 220 being prevented from being exposed directly to rain drops. The near-infrared LED 210 and the photographing block 220 are mounted downwardly toward a road surface with reference to a level position. This prevents direct sunlight from falling on the photographing block 220, so that influence of backlight can be lessened. Moreover, it is desirable to use a narrow angle lens for the photographing block 220. Since this makes a chance of the sunlight getting into an image smaller, influence of backlight can be abated further.

Figure 5:
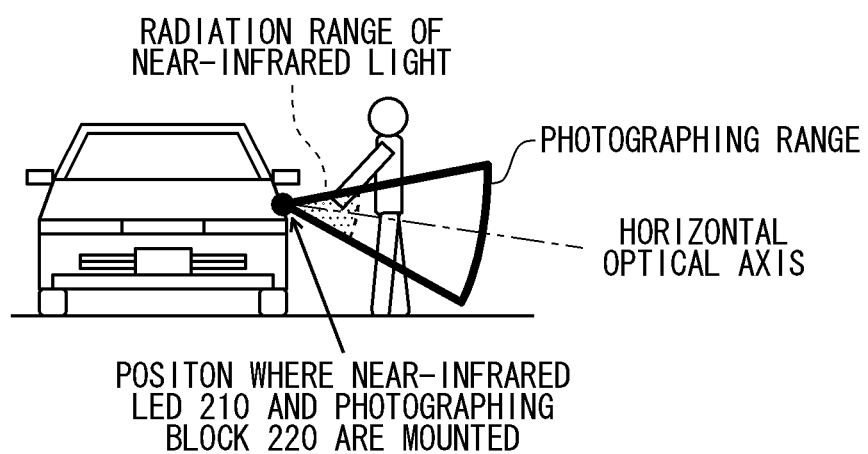
FIG. 5 is a diagram that explains a near-infrared radiation range and a photographing range.

FIG. 5 shows a near-infrared radiation range and a photographing range achieved when the near-infrared LED 210 and the photographing block 220 are mounted as above. A part of the user's body that approaches closest to the near-infrared LED 210 and the photographing block 220 is a hand that is naturally stretched by the user to the door handle. As a result of the near-infrared LED 210 and the photographing block 220 being mounted at any of the above-mentioned positions, the photographing block 220 can photograph the user's hand without imposing a burden on the user.

Figure 6:
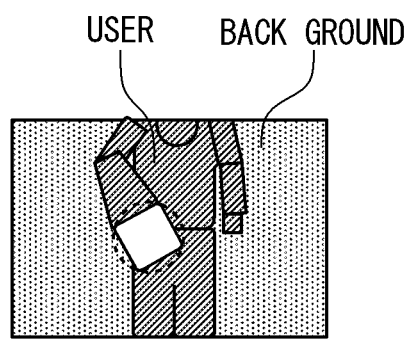
FIG. 6 is a diagram that explains a quantity of light from a near-infrared LED at which saturation of a user's hand occurs.

As shown in FIG. 6, a quantity of light radiated from the near-infrared LED 210 is previously adjusted in such a way that only the user's hand designated by a dotted line in FIG. 6 comes to be represented by saturated (white) pixels in the image captured by the photographing block 220 while the user remains stretched his/her hand to the door handle of the passenger door (a distance between the user's hand irradiated by the near-infrared LED 210 and the photographing block 220 is within 30 cm). The quantity of light radiated from the near-infrared LED 210 achieved at this time is called a "quantity of saturated light." In the course of determination of user's operation (step S101), the LED control block 202 controls the near-infrared LED 210 such that the quantity of light radiated from the near-infrared LED 210 comes to a quantity of saturated light. A quantity of light radiated from the near-infrared LED 210 can be switched according to an application.

Figure 7:
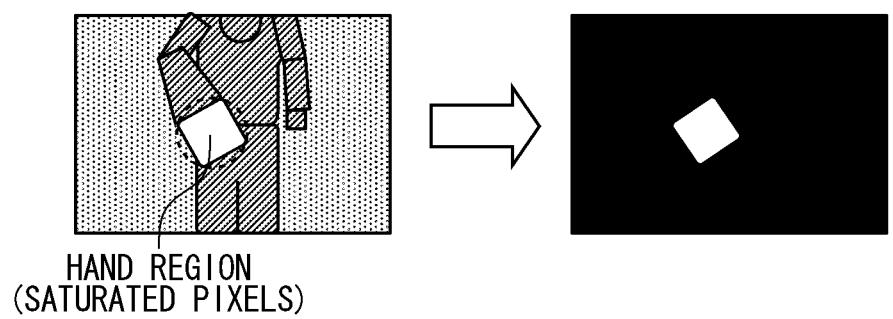
FIG. 7 is a conceptual rendering showing exemplary extraction of a user' hand region.

The hand region extraction block 203 extracts a user's hand region from the image captured by the photographing block 220. FIG. 7 shows a conceptual rendering of extraction of a hand region. As mentioned previously, during the course of determination of user's operation (step S101), the user's hand region is represented by saturated pixels in the image. Therefore, in order to extract the hand region, what is required is only to extract just the saturated pixels from the image. For instance, when the image captured by the photographing block 220 is converted into a binary image in which the saturated pixels represent white pixels and in which the other pixels represent black pixels, a region of the white pixels in the binary image can be deemed as a user's hand region. Since noise or a reflecting object is present in a real image, noise components must be eliminated, as needed, by subjecting the binary image to noise treatment, such as expansion and contraction treatments. Moreover, the premise behind the image is that a distance between the user's hand and the photographing block 220 is within 30 cm, the user's hand is photographed as an image of a given size or more. Consequently, processing for eliminating white pixels that do not correspond to the hand region, by eliminating a white region of less than the given size is also effective.

Next, the motion detection block 204 detects motions of the user's hand from a hand trajectory and changes in hand shape that show how a position of the hand region extracted by the hand region extraction block 203 moved.

Figure 8A:
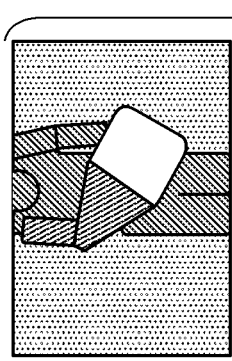
FIG. 8A is a diagram showing a result of exemplary extraction of an image and a hand region at time "n.
Figure 8B:
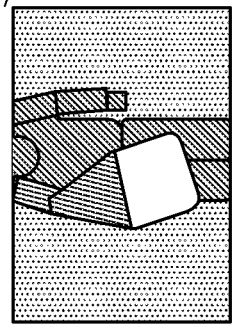
" FIG. 8B is a diagram showing a result of exemplary extraction of the image and the hand region at time "n+1.
Figure 8C:
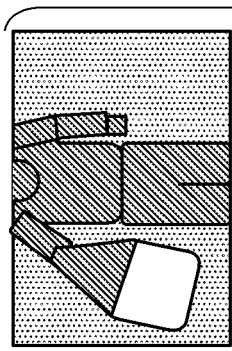
" and FIG. 8C is a diagram showing a result of exemplary extraction of the image and the hand region at time "n+2."
Figure 9A:
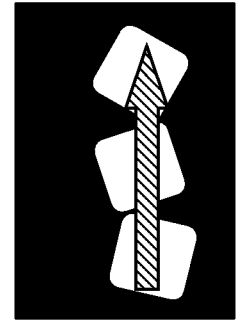
FIGS. 9A and 9B are diagrams showing an exemplary trajectory of a hand detected at time "n" to time "n+2."
Figure 9B:
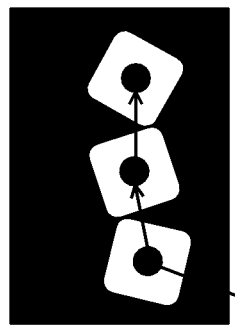

Detection of the trajectory of the hand that is performed by the motion detection block 204 is now described by reference to FIGS. 8A to 8C and FIGS. 9A and 9B. FIGS. 8A to 8C show examples in which positions of the respective hand regions are detected at time "n," time "n+1," and time "n+2." FIGS. 9A and 9B show results of detection of a trajectory of the hand extracted at times "n" to "n+2" from the results of extraction of the hand regions. In the examples shown in FIGS. 8A to 8C and FIGS. 9A and 9B, the user moved his/her hand from left to right in the images (from right to left from a user's standpoint).

In the embodiment, since the hand region extraction block 203 extracts the hand region before hand, the motion detection block 204 can readily detect the trajectory of the hand without utilization of complicate follow-up processing (tracking processing) employed in image processing. For instance, as shown in FIG. 9A, the motion detection block 204 can calculate a centroid position of the hand region at each of times on the video, thereby detecting a trajectory of the user's hand from shifts in centroid position with time. Although the horizontal trajectory has been described as an example in the above, another trajectory (for instance, a vertical motion and a circular motion) can also be determined in the same way.

Figure 10A:
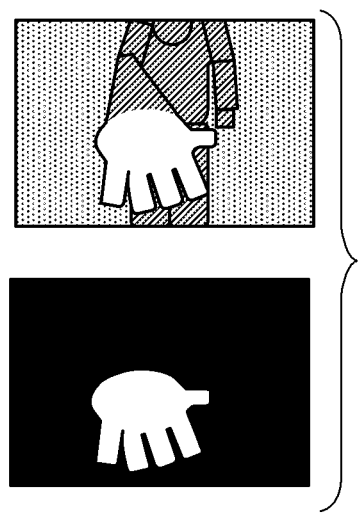
FIG. 10A is a diagram showing an exemplary result of extraction of an image showing a user's extended hand and a hand region.
Figure 10B:
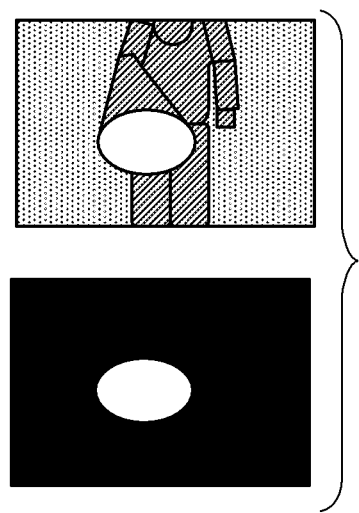
FIG. 10B is a diagram showing an exemplary result of extraction of an image showing a user's clenched hand and the hand region.

Detection of a change in hand geometry that is detected by the motion detection block 204 is now described by reference to FIGS. 10A and 10B. FIG. 10A shows an example hand region acquired when the user extended his/her hand, and FIG. 10B shows another example hand region acquired when the user clenched his/her hand. A way to detect a geometrical change between an open hand and a closed hand can readily be implemented by comparison of areas of the hand regions. When the area of the hand region is large, the hand is open. In the meantime, when the area of the hand region is small, the hand is closed. The motion detection block 204 can detect a geometrical change in the user's hand from shifts in areas of the hand regions with time. Incidentally, when the hand stays in a substantially unchanged position but exhibits only a geometrical change, the trajectory of the hand is not detected. The geometrical change in hand detected by the motion detection block 204 is not limited to the opening and closing of the hand shown in FIGS. 10A and 10B but may also be another change; for instance, how many fingers are held up. In this case, the motion detection block 204 performs template matching by use of a previously-prepared template image representing a held-up finger or thins a hand region into line segments and checks the number of resultant line segments, thereby detecting a geometrical change in hand.

The operation command control block 205 determines whether or not the motion detected by the motion detection block 204 matches the information stored in the user operation database 206. The information stored in the user operation database 206 means one pertaining to previously-defined hand motions corresponding to operation for locking/unlocking or opening/closing the opening/closing element. If a determination result shows matched information, the operation command control block 205 sends a control command to the unlocking/locking ECU 300 and the door open/close ECU 400. The opening/closing element is actuated by control operation of the unlocking/locking ECU 300 or the door open/close ECU 400 according with the control command. As above, the opening/closing element is actuated on the basis of the user's intended motion, thereby preventing occurrence of user's unintended erroneous operation of the opening/closing element.

In the embodiment, the near-infrared LED and the photographing block are mounted for each of the opening/closing elements. Accordingly, which one of the opening/closing elements the user desires to activate can be determined by which one of the photographing blocks is now photographing the user's motion. Therefore, the control command transmitted to the unlocking/locking ECU 300 and the door open/close ECU 400 includes information about which one of the opening/closing elements the control command is directed as well as specifics of operation of the opening/closing element. Moreover, in the embodiment, when the user's hand stays away from a range of 30 cm from the near-infrared LED and the photographing block, the hand region extraction block 203 cannot extract a user's hand region. Therefore, even when the user is photographed by means of a photographing block mounted near another opening/closing element that is different from the opening/closing element the user is about to operate, the other opening/closing element will not erroneously detect the user's motion.

Detailed explanations have been given to user operation determination processing (step S101) thus far.

Figure 11:
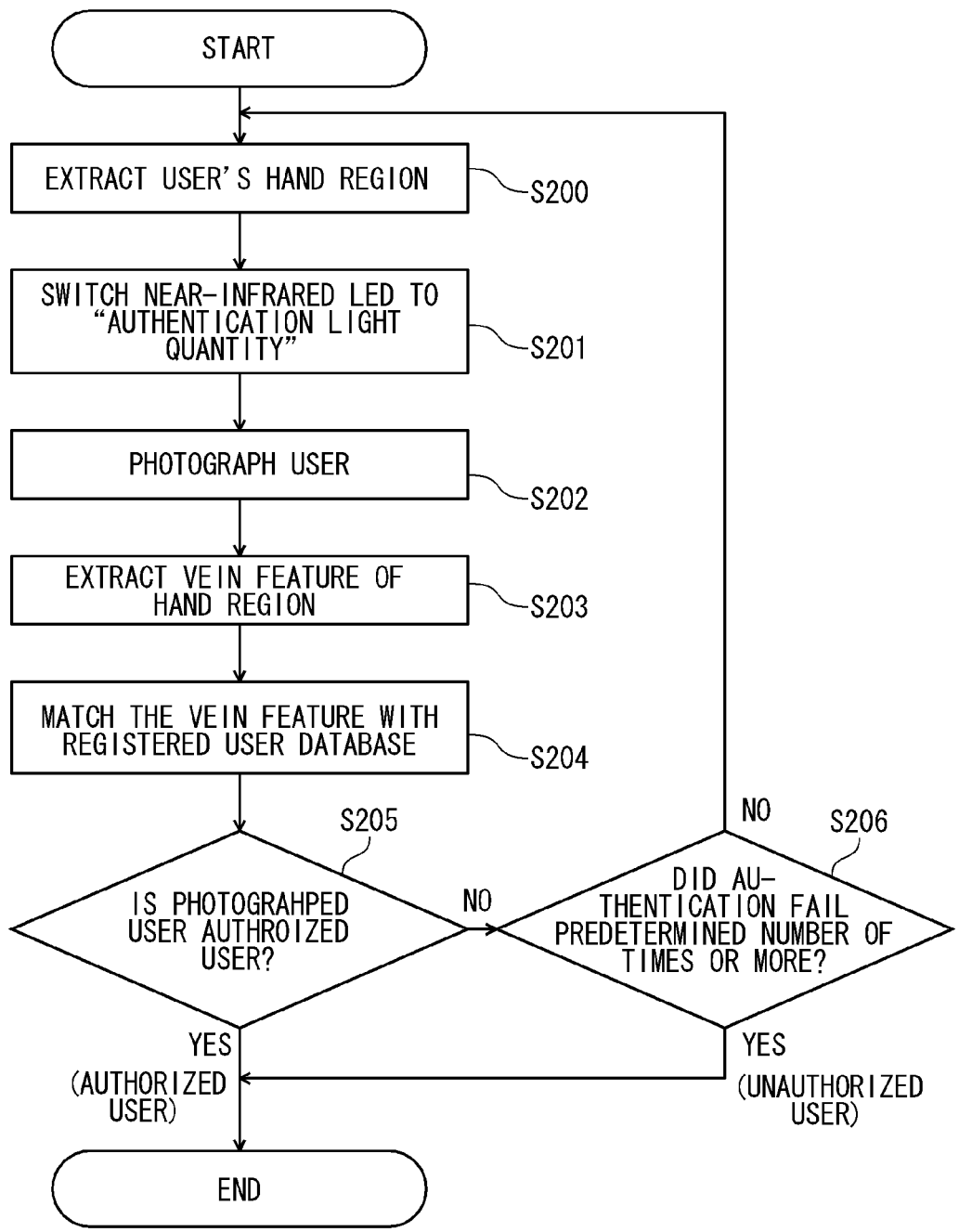
FIG. 11 is a flowchart showing operation of the open-close control ECU 200 that performs operation pertaining to a user authentication mode (step S100).

The system of the embodiment can also perform user operation determination processing (step S101) and user authentication processing (step S100) all together. Details of user authentication processing (step S100) performed when the user authentication mode is available are now described by reference to FIG. 11. FIG. 11 is a flowchart showing operation of the open-close control ECU 200 that performs user authentication processing (step S100).

As shown in FIG. 5, the quantity of light radiated from the near-infrared LED 210 is previously adjusted so that the photographing block 220 can photograph an image from which the vein feature extraction block 207 can extract a feature of the vein of the user's hand while the user stretched his/her hand to the door handle of the passenger door (when the point of the user falls within the range of 30 cm from the near-infrared LED 210 and the photographing block 220). The quantity of light radiated from the near-infrared LED 210 is called an "authentication light quantity."

When the user authentication mode is available, the hand region extraction block 203 extracts the user's hand region from the image photographed by the photographing block 220 (step S200). A way to extract the hand region performed this time is the same as that described in connection with user operation determination processing (step S101). Specifically, the way corresponds to processing for setting the quantity of light radiated from the near-infrared LED 210 to the "saturated light quantity," photographing the user while irradiating the user with near-infrared light, and extracting saturated pixels from a resultant image.

When the user's hand region can be extracted, the LED control block 202 immediately switches the quantity of light radiated from the near-infrared LED 210 to the "authentication light quantity" (step S201). The photographing block 220 then photographs the user (step S202). The user's hand region is already known at this time by means of processing pertaining to step S200. Therefore, after extracting an image of the hand region from the image photographed in step S202, the vein feature extraction block 207 extracts a vein feature from the image of the hand region (step S203). Next, the vein feature matching block 208 matches the thus-extracted vein feature with the information stored in the registered user database 209 (step S204), thereby determining whether or not the photographed user is the authorized user (step S205).

In consideration of a possibility that a user's vein feature cannot be well acquired by single photographing operation, processing pertaining to steps S200 to S205 can be iterated a previously-determined number of times. When the photographed user cannot be determined as the authorized user even when user authentication is iterated the predetermined number of times (step S206), the open-close control ECU 200 determines that the photographed user is not the authorized user, thereupon ending processing.

A target from which a vein feature is to be extracted is set to a palm or back of the user's hand. Therefore, in order for the user to go through authentication, the user must intentionally stretch the palm or back of his/her hand forth to the near-infrared LED 210 and the photographing block 220. Since any persons other than the authorized user do not know the restrictions, security can be enhanced further.

When the photographed user is determined not to be the authorized user, the operation command control block 205 will not send the command for activating the opening/closing element to the unlocking/locking ECU 300 or the door open/close ECU 400 without depending on a detection result of the motion detection block 204. When the user authentication mode is available, any users other than the authorized user become unable to control the opening/closing elements.

Finally, the unlocking/locking ECU 300 unlocks or locks the opening/closing element in accordance with the control signal from the operation command control block 205. Further, the door open/close ECU 400 opens or closes the opening/closing element in accordance with the control signal from the operation command control block 205. Known techniques are available for a mechanical structure that unlocks/locks and opens/closes the opening/closing element.

In the embodiment, explanations are given on the premise that the user's hand stays away from the near-infrared LED and the photographing block by 30 cm or less; however, the distance is not limited to 30 cm. For instance, so long as the distance is made shorter, the system can prevent occurrence of erroneous operation more thoroughly. If the distance is made longer, there will be yielded an advantage of the range over which the system can detect the user's hand becoming broader.

In the embodiment, when the vehicle is in a parked state, equipment hardware making up the vehicle equipment 20 except the electronic key ECU 100 and the vehicle-side transceiver 101 is set to a power-off or power-saving state. When determined the user's approach, the electronic key ECU 100 activates the power of the vehicle equipment 20. Unwanted consumption of power in the vehicle in a parked state can thereby be prevented.

Moreover, the position of the user carrying the portable device 10 is located by use of the intensity and directivity of radio waves determined from wireless communication established between the portable device 10 and the vehicle-side transceiver 101 provided in the electronic key ECU 100, whereby power of any set of the near-infrared LEDs 210 to 213 and the photographing blocks 220 to 223 under control of the open-close control ECU 200 can be selectively activated. For instance, when the user carrying the portable device 10 is located as being near a right front passenger door, the power of the near-infrared LED 210 and the photographing block 220 is activated, and the power of the other near-infrared LEDs 211 to 213 and the photographing blocks 221 to 223 is set to off or a power-saving state. This wards off dissipation of unwanted power.

Hand motions corresponding to unlocking/locking operation or door closing/opening operation may also be defined for each opening/closing element in the user operation database 206. For instance, hand motions for opening the right passenger doors can be defined as motions for moving the hand from right to left when viewed from the user. In the meantime, hand motions for opening the left passenger doors can be defined as motions for moving the hand from left to right when viewed from the user. As a result, since the hand motions coincide with the direction in which the passenger door is opened and closed, the user can operate the door in a more sensory way.

There can also be a mechanism for readjusting the "saturated light quantity" and the "authentication light quantity" that represent the quantity of light radiated from each of the near-infrared LEDs 210 to 213, with reference to the quantity of previously adjusted light and in accordance with illumination intensity of near-infrared light achieved at the peripheral regions of the opening/closing elements where the respective LEDs are mounted. For instance, even if the previously adjusted quantity of light is irradiated when the illumination intensity of the near-infrared light achieved around the opening/closing element is high, a difference between illumination intensity of the user's hand and illumination intensity of the other regions will become smaller, as a result of which the user's hand might not be sufficiently saturated in a photographed image. Because of this, when the illumination intensity of near-infrared light achieved around the opening/closing element is high, light that is more intensive than the previously adjusted quantity of light radiated from the near-infrared LED is irradiated, whereby stable photographing can be carried out without regard to the illumination intensity of near-infrared light achieved around the opening/closing element.

As described above, in the system for controlling vehicle opening/closing element of the embodiment, the near-infrared LED and the photographing block are mounted as one set so that a region of the user's hand can be extracted without fail. Further, the user is photographed while the quantity of near-infrared light is adjusted such that information about the user's hand can be reliably acquired. The user's hand region is extracted from the thus-photographed image, thereby detecting user's motions. An operation command for the opening/closing element is controlled in accordance with the thus-detected motions. Therefore, motions based on the user's intension can be accurately determined without depending on the environment. In response to the user's wish to open or close the vehicle opening/closing element, the opening/closing element can be controlled without a user's touch with the opening/closing element.

Though the currently considerable preferred embodiments are described, it is apparent that the invention may be modified in various manners within the scope and spirit of the invention.

While the present invention has been described in detail, or with reference to the specific embodiments, it is apparent for those skilled in the art that the invention may be modified and changed in various manners without departing from the scope and spirit of the invention.

This invention is based on Japanese Patent Application (Japanese Patent Application No. 2011-167235) filed on Jul. 29, 2011, the content of which is incorporated herein by reference.

The apparatus for controlling vehicle opening/closing element of the invention is useful as an apparatus for controlling vehicle opening/closing element, or the like, in a smart key entry system.

According to the invention, user's motion can be accurately identified without depending on an environment. Accordingly, the invention yields an advantage of the ability to control an vehicle opening/closing element without a user's touch with the element according to a user's wish to open or close the element.

What is claimed is:
1. An apparatus for controlling vehicle opening/closing element, including:
   a near-infrared light radiation block configured to irradiate near-infrared light to a peripheral region of a vehicle opening/closing element;
   a photographing block configured to photograph an image including the region irradiated with the near-infrared light;

a hand region extraction block configured to extract a user's hand region from brightness of the image photographed by the photographing block;

a motion detection block configured to detect motions of the user's hand from a hand region extracted by the hand region extraction block; and an opening/closing element operation command control block configured to command operation of the opening/closing element if a match exists between the motions detected by the motion detection block and previously-set predetermined motions.

2. The apparatus for controlling vehicle opening/closing element according to claim 1, wherein the near-infrared light radiation block and the photographing block are placed in a peripheral region of an operation block of the opening/closing element to which the hand can come closest among body parts of the user.

3. The apparatus for controlling vehicle opening/closing element according to claim 1, wherein the near-infrared light radiation block and the photographing block are placed beneath a door handle of the vehicle.

4. The apparatus for controlling vehicle opening/closing element according to claim 1, wherein the near-infrared light radiation block and the photographing block are placed pointing in parallel to or downwardly with reference to a road surface.

5. The apparatus for controlling vehicle opening/closing element according to claim 1, wherein the near-infrared light radiation block is configured to radiate a quantity of near-infrared light that saturates a brightness value of pixels of a region, in an image photographed by the photographing block, which represents a subject located within a predetermined distance from the opening/closing element.

6. The apparatus for controlling vehicle opening/closing element according to claim 1, wherein the hand region extraction block is configured to extract, as the user's hand region, a region of pixels whose brightness values are saturated in the image photographed by the photographing block.

7. The apparatus for controlling vehicle opening/closing element according to claim 1, wherein the motion determination block is configured to take, as a target, a trajectory or geometry of the hand as hand motions to be detected.

8. The apparatus for controlling vehicle opening/closing element according to claim 1, wherein the opening/closing element operation command control block is configured to control locking, unlocking, opening, and closing of the opening/closing element according to the user's hand motions detected by the motion detection block.

9. The apparatus for controlling vehicle opening/closing element according to claim 1, wherein the apparatus controls a plurality of vehicle opening/closing elements and a distinct near-infrared light radiation block and photographing block are respectively designated to each of the vehicle opening/closing elements.

10. The apparatus for controlling vehicle opening/closing element according to claim 9, wherein the opening/closing element operation command control block is configured to control the one of the plurality of the opening/closing elements that corresponds to the photographing block that photographs the image when the motion detection block detects the hand motions.

11. The apparatus for controlling vehicle opening/closing element according to claim 1, further including a user authentication block configured to determine whether or not the user who is about to operate the opening/closing element is an authorized user of the vehicle, the opening/closing element operation command control block being configured to command operation of the opening/closing element when the user authentication block determines that the user is an authorized user.

12. The apparatus for controlling vehicle opening/closing element according to claim 11, wherein the user authentication block is configured to determine whether or not the user is an authorized user by means of authenticating a vein of the hand region utilizing near-infrared light.

13. The apparatus for controlling vehicle opening/closing element according to claim 12, wherein the near-infrared light radiation block is configured to radiate a quantity of near-infrared light that enables extraction of a vein feature from the image of the user's hand region photographed by the photographing block when the user authentication block performs vein authentication.

* * * * *